United States Patent [19]

Yamaji et al.

[11] Patent Number: 4,558,875
[45] Date of Patent: Dec. 17, 1985

[54] AQUEOUSLY-SWELLING WATER STOPPER AND A PROCESS FOR STOPPING WATER THEREBY

[75] Inventors: Hajime Yamaji; Takeshi Kobayashi, both of Fukuyama City, Japan

[73] Assignee: Hayakawa Rubber Co. Ltd., Japan

[21] Appl. No.: 680,607

[22] Filed: Dec. 12, 1984

Related U.S. Application Data

[63] Continuation of Ser. No. 249,628, Mar. 31, 1981.

[30] Foreign Application Priority Data

Apr. 5, 1980 [JP] Japan ................................ 55-44866
Nov. 14, 1980 [JP] Japan ............................... 55-159406

[51] Int. Cl.⁴ ............................................ E02D 29/16
[52] U.S. Cl. ................................. 277/227; 52/169.14; 106/DIG. 4; 252/8.5 A
[58] Field of Search ............... 277/227, 207 A, 228; 524/447, 518, 519, 515, 493, 456; 523/130; 52/169.14, 309.17, 396, 403, 732; 102/DIG. 4; 405/270; 252/8.5 A

[56] References Cited

U.S. PATENT DOCUMENTS

| | | | |
|---|---|---|---|
| 475,870 | 5/1892 | Jones | 277/228 |
| 1,631,265 | 6/1927 | Harris | 106/DIG. 4 |
| 2,277,286 | 3/1942 | Bechtner | 52/396 |
| 2,431,384 | 11/1947 | Fischer | 52/396 |
| 2,849,070 | 8/1958 | Maly | 277/9.5 |
| 2,867,160 | 1/1959 | Wangerow | 52/396 |
| 3,023,681 | 3/1962 | Worson | 52/396 |
| 3,220,946 | 11/1965 | Turner | 252/8.5 A |
| 3,241,278 | 3/1966 | Magers, Jr. | 52/396 |
| 3,250,235 | 5/1966 | Higgins | 524/447 |
| 3,440,934 | 4/1969 | Dill | 52/309.17 |
| 3,445,322 | 5/1969 | Saiia et al. | 52/169.14 |
| 3,561,177 | 2/1971 | Agro | 52/169.14 |
| 3,579,724 | 5/1971 | Toth | 52/403 |
| 3,603,055 | 9/1971 | Dale | 52/403 |
| 4,174,992 | 11/1979 | Fujii | 524/515 |
| 4,174,993 | 11/1979 | Fujii | 524/515 |
| 4,201,308 | 5/1980 | Neumann | 524/447 |
| 4,279,547 | 7/1981 | Clem | 106/DIG. 4 |
| 4,316,833 | 2/1982 | McGroarty | 524/447 |
| 4,443,019 | 4/1984 | Ishido | 277/227 |

OTHER PUBLICATIONS

The Condensed Chemical Dictionary 5th Ed. 1956, pp. 138, 871, 872.
Reinhold Plastics Application Series 1961, pp. I and IX.
Webster's New Collegiate Dictionary 1956, p. 646.

*Primary Examiner*—Robert I. Smith
*Attorney, Agent, or Firm*—Parkhurst & Oliff

[57] ABSTRACT

The disclosed water stopper and water stopping process use an aqueously-swelling water-stopping composition consisting of 10 to 40 weight % of rubber whose main ingredient is polyisobutylene, 10 to 20 weight % of silicate, 10 to 60 weight % of bentonite, said silicate and bentonite acting as fillers, and 10 to 40 weight % of plasticizer. The aforesaid water-stopping composition may be extruded into an elongated water stopper with or without a core therein, which water stopper can be inserted in a joint gap or other gap of structural members to stop water at the gap.

17 Claims, 25 Drawing Figures

AQUEOUSLY-SWELLING WATER STOPPER AND A PROCESS FOR STOPPING WATER THEREBY

This is a continuation of Ser. No. 249,628 filed Mar. 31, 1981.

BACKGROUND OF THE INVENTION

1. Field of the Invention

This invention relates to a novel aqueously-swelling water stopper to be placed in a joint gap of structural members to fill up the joint gap and stop water there. The invention also relates to a process of stopping water by using such water stopper.

More particularly, the invention relates to water stopper having an outer resilient rubber layer made of aqueously-swelling water-stopping composition with or without a core having a high tensile strength, which rubber layer absorbs water and swells upon absorbing water to expand the volume thereof, and the invention also relates to a process of stopping water in architectural or other public structure (to be referred to "building structure", hereinafter) by disposing the aforementioned water stopper in a juncture gap or other gap of concrete or metallic structural member of the building structure, so that when water flows into the gap the rubber layer swells to fully prevent water from seeping in or leaking out relative to the gap of the building structure.

2. Description of the Prior Art

In constructing various building structures, numerous water stoppers have been used, which are made of rubber, plastics, asphalt and the like. Such water stoppers of the prior art have shortcomings in that most of them have good adhesiveness but they are too soft and sometimes sticky, and that their properties vary with temperature variation, for instance, they become too hard in winter to use in the field. Besides, after being used for a long period of time, the water stopper of the prior art tends to reduce their resiliency or to become subject to creep phenomenon, so that the water stopper becomes less adaptable to fluctuation of structural gaps and fails to maintain full water stopping ability thereof.

It has been proposed recently to provide aqueously-swelling water-stopping composition by adding aqueously-swelling organic substance in non-cross-linked rubber type water stopper to improve the water-stopping ability thereof. The proposed water-stopping composition has difficulties in that, when the compounding ratio of the aqueously-swelling organic substance is low, sufficient water-stopping ability cannot be achieved, while if the compounding ratio thereof is too high, the dispersion of the aqueously-swelling organic substance in the rubber matrix becomes insufficient and the strength of the composition is considerably reduced. Besides, the aqueously-swelling organic substance is subject to hydrolysis, deterioration by oxidation, and decomposition, and its swelling ability tends to be weakened as the swelling and drying are repeated, and the residual low molecular weight components tend to cause poisonous effects.

Various new water stoppers are recently used at joints of concrete preformed members in the field of civil engineering constructions, such as junctions of box culvert sections and concrete flumes. Such new water stoppers are, for instance, those made of soft resilient asphalt, those having semi-hard plastics cores enclosed by soft adhesive mainly consisting of atactic polypropylene, those made of foam rubber or foamed plastics, or the foregoing water stoppers provided with adhesive layers disposed on all or a part of the outer surfaces thereof.

It is noted that joint portions of preformed concrete members are often made in socket-and-plug type or male-female type. Such joint portions sometimes cause water leakage, because of insufficient dimensional accuracy in spite of substantial overall uniformity of dimensions, improper field work at the site, or uneven sinking of the land.

The aforesaid water stoppers mainly consisting of resilient soft asphalt or atactic polypropylene have such a temperature sensitivity that, in winter they become too hard and their workability is reduced, while in summer they become too soft and sticky so that their workability is reduced also in summer. The foam structure and compressibility of the foam rubber or foamed plastics of the aforesaid water stoppers of the prior art are such that the water stoppers cannot fully absorb the dimensional inaccuracy and unevenness of the concrete surfaces. Such insufficient workabilities and properties of materials have been causes of water leakage in the prior art.

SUMMARY OF THE INVENTION

Therefore, an object of the present invention is to obviate the aforesaid shortcomings and difficulties of the prior art, by providing a novel water stopper and a novel process of stopping water wherein dimensional inaccuracy and difference of field conditions at construction sites are absorbed by aqueously-swelling function of the water stopper, so as to prevent water leakage.

To fulfil the aforesaid object, the invention provides an aqueously-swelling water-stopping composition consisting of 10 to 40 weight % of rubber whose main ingredient is polyisobutylene, 10 to 20 weight % of silicate, 10 to 60 weight % of bentonite, said silicate and bentonite acting as fillers, and 10 to 40 weight % of plasticizer.

A simple form of the water stopper of the present invention comprises an extruded member of the above-mentioned aqueously-swelling water-stopping composition, without using any core member therein.

A preferred embodiment of the aqueously-swelling water stopper according to the present invention is characterized in that the water stopper comprises an elongated core member having a high tensile strength, and at least one layer of the aqueously-swelling water-stopping composition secured to the outer surface of said core member.

The elongated core member having a high tensile strength can be made of hard rubber, hard plastics, metal, or a combination thereof. The shape of the elongated core member can be of solid bar, hollow bar, string-like form, or planar form. The layer of the aqueously-swelling water-stopping composition can be applied to the elongated core member so as to enclose the core member.

Another object of the present invention is to provide an aqueously-swelling water stopper comprising an elongated core member with a high tensile strength, and at least two covering layers enclosing the core member, and outer layer of said covering layers being made of aqueously-swelling water-stopping composition, and at least a part of an outermost layer of said covering layers being made of water-passing resilient substance such as sponge.

Another object of the present invention is to provide an aqueously-swelling water stopper comprising an elongated core member, at least one layer of aqueously-swelling water-stopping composition secured to the outer surface of said core member, and an adhesive layer secured to the outer surface of said layer of aqueously-swelling water-stopping composition.

A further object of the present invention is to provide a process of stopping water at a gap in building structure comprising steps of forming a water stopper by enclosing an elongated core member having a high tensile strength with a layer of aqueously-swelling water-stopping composition; and placing the water stopper in the gap of the building structure, whereby the water stopper swells by absorbing water from the inside or outside of the structure so as to fill up that portion of the gap where said water stopper is placed. The water stopper may include a plurality of soft rubber layers enclosing the core member, and the aforesaid aqueously-swelling water-stopping composition layer may be the outermost layer of said plurality of layers.

Another object of the present invention is to provide a process of stopping water at a gap in building structure, comprising steps of forming a water stopper by enclosing an elongated core member having a high tensile strength with at least one layer of aqueously-swelling water-stopping composition and an outermost layer having at least a part thereof made of water-passing resilient substance, said aqueously-swelling water-stopping composition consisting of 10 to 40 weight % of rubber whose main ingredient is polyisobutylene, 10 to 20 weight % of silicate, 10 to 60 weight % of bentonite, said silicate and bentonite acting as fillers, and 10 to 40 weight % of plasticizer; and placing the water stopper in the gap of the building structure, whereby the water stopper swells by absorbing water from the inside or outside of the structure so as to fill up that portion of the gap where the water stopper is placed.

A still further object of the present invention is to provide a process of stopping water at a gap in building structure, comprising steps of forming a water stopper by enclosing an elongated core member having a high tensile strength with at least one layer of aqueously-swelling water-stopping composition consisting of the aforesaid polyisobutylene-containing rubber, silicate, bentonite, and plasticizer, said water stopper having at least one adhesive layer secured to said layer of said composition; and placing the water stopper in the gap of the building structure, whereby the water-stopper swells by absorbing water from the inside or outside of the structure so as to fill up that portion of the gap where the water stopper is placed.

In an embodiment of the invention, a water stopper is made by extruding aqueously-swelling water-stopping composition consisting of the aforesaid polyisobutylene-containing rubber, silicate, bentonite, and plasticizer, which water stopper is inserted between adjacent concrete or metallic segments so as to stop water at the joint between the segments.

In another embodiment of the invention, a water stopper is made by applying a pair of water-stopping layers on the surface of an elongated flat core member having a high tensile strength, said water-stopping layer being made of the aforesaid aqueously-swelling water-stopping composition consisting of polyisobutylene-containing rubber, silicate, bentonite, and plasticizer, whereby the pair of water-stopping layers are buried in adjacent concrete structures so as to prevent water leakage at the junction of the concrete structures.

BRIEF DESCRIPTION OF THE DRAWINGS

For a better understanding of the invention, reference is made to the accompanying drawings, in which.

Like parts are designated by like numerals and symbols throughout different views of the drawings.

DESCRIPTION OF THE PREFERRED EMBODIMENTS

Figure 1:
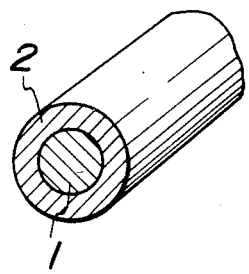
FIGS. 1 through 6 are schematic perspective views of water stoppers of the invention, which are formed by enclosing solid cores with aqueously-swelling water-stopping composition.
Figure 2:
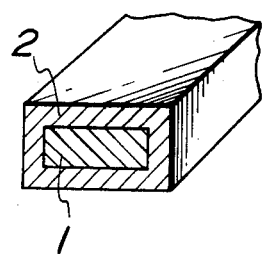
Figure 3:
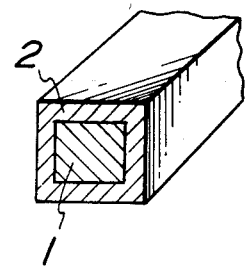
Figure 4:
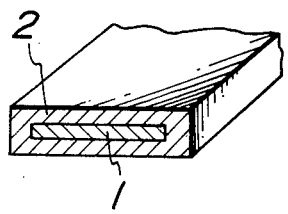
Figure 5:
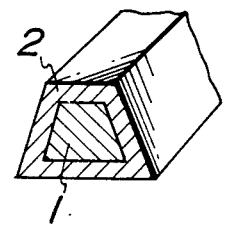
Figure 6:
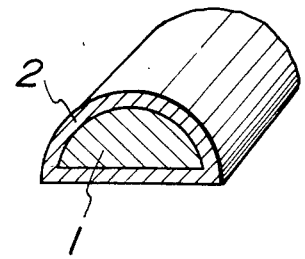

The aqueously-swelling water-stopping composition according to the present invention will be described at first, by referring to the nature, composition, production, and examples thereof.

The present invention uses polyisobutylene which is a polymer of isobutylene, which polymer has a long chain shape with unsaturated portions at the ends of a molecule. Polyisobutylene is very stable both physically and chemically. The polymers with molecular weights of 70,000 to 130,000 are preferable in the present invention.

Although polyisobutylene alone can be used, it is also possible to mix polyisobutylene with natural or synthetic rubber. The rubber material to be used together with polyisobutylene in the present invention can be natural rubber, butadiene rubber, styrene-butadiene rubber, acrylonitrile-butadiene rubber, chloroprene rubber, isoprene rubber, butyl rubber, ethylene-propylene terpolymer rubber, reclaimed rubber of any of the aforesaid rubbers, and the like. A mixture of two or more of the aforementioned rubbers may be also used in the present invention.

The silicate to be used in the present invention can be silicic acid anhydride, hydrous silicic acid, calcium silicate, and the like. A mixture of two or more of the aforementioned silicates can be also used in the invention. The silicic acid anhydride to be used in the invention should have a purity of 99% or more in terms of silicon dioxide ($SiO_2$) and an average grain size of not larger than 2 m$\mu$. Hydrous silicic acid is produced and used in large quantities, and the hydrous silicic acid to be used in the present invention should containing 80 to 90% of silicon dioxide ($SiO_2$) and have an average grain size of 15 to 50 m$\mu$. Calcium silicate is produced by a reaction of sodium silicate and a soluble salt of calcium, and calcium silicate with an average grain size of about 50 to 800 m$\mu$ can be used in the present invention.

Bentonite has a main ingredient of montmorillonite and contains quartz, feldspar, and calcite. The major components of bentonite are silicon dioxide ($SiO_2$) and aluminium oxide ($Al_2O_3$). Bentonite is characterized by its properties of absorbing water and swelling to a great extent.

As regards the plasticizer, it is necessary to make selection to a certain extent depending on the type of rubber being used, but in general, it is possible to use mineral oil softeners, vegetable oil softeners, fatty acid, fat and oil, esters, phosphates, paraffinic derivatives, and the like. Examples of the plasticizer are paraffinic mineral oils, naphthenic mineral oils, aromatic mineral oils, stearic acid, palmitic acid, calcium stearate, castor oil, cotton seed oil, rapeseed oil, paraffin, paraffin chloride, dioctyl phthalate, dioctyl adipate, dibutyl sebacate, tricresyl phosphate, liquid chloroprene, liquid polyisobutylene, liquid polybutadiene, liquid polyisoprene, liquid polybutene, and the like.

The aqueously-swelling water-stopping composition of the present invention is made of the aforesaid ingredients, and the ratio of the ingredients is modified to some extent depending on the purpose of the use thereof. Preferably, the weight percents of the ingredients in the composition of the invention in terms of (rubber):(silicate filler):(bentonite filler):(plasticizer) are in a range of (10–40):(10–20):(10–60):(10–40). In the aforementioned ratios, if the quantity of the silicate filler is less than 10 weight %, the degree of swelling by water absorption (to be referred to as "aqueous swelling", hereinafter) is small and sufficient water-stopping effect cannot be achieved. On the other hand, if the quantity of the silicate filler exceeds 20 weight %, the shaping of the composition becomes difficult and the resultant composition becomes unduly brittle. When the quantity of the bentonite filler is less than 10 weight %, the degree of aqueous swelling becomes too small to achieve the desired water-stopping effect, while the bentonite filler in excess of 60 weight % is not desirable because the composition becomes to fragile after the aqueous swelling.

The kind and amount of the plasticizer can be adjusted so as to produce proper hardness of the composition which meets specific requirements of each application. It is not desirable to make the composition too hard, because the too hard composition results in a small degree of the aqueous swelling, causes difficulty in achieving the flatness of overlapped joint portions, and necessitates a large force for tightening. Excessive amount of the plasticizer is not desirable, because it tends to cause a low shaping workability, low processing workability due to the high deformability thereof, and low resistance against water pressure.

In addition to the aforementioned indispensable ingredients, it is possible to use conventional ingredients such as other fillers, age resistors, lubricants, tackifiers, and the like.

As regards the mixer to mix the ingredients, a regular rubber mixer such as a mixing mill, a kneader, and a Banbury mixer can be used. A suitable shaping machine is an extruder or a calender roller. The shaping of the composition of the invention can be carried out in a manner similar to that of the conventional water stopper made of rubber.

The aforesaid water-stopping composition according to the present invention has the same resiliency and workability as those of the conventional rubber water stopper, so that when the composition of the invention is filled in gaps at various structural joints, complete stopping of water is achieved thereby. Besides, even if gaps should be caused at the water-stopping portion due to some reasons during or after construction in the case of using the composition of the invention, when water reaches the water-stopping portion, the composition of the invention absorbs water and swells until the composition fills up the thus caused gaps, so as to fully eliminate water leakage at the water-stopping portion. Furthermore, the composition of the invention does not contain any water-soluble ingredients, so that there is not risk of causing any water pollution. The ingredients of the composition of the invention are free from hydrolysis and rotting, so that the composition is highly durable.

Accordingly, the composition of the invention is particularly useful to stop water at joints of segments in tunnel construction, at junctions of Hume pipes, at abutting portions of building outside wall panels, at packings to prevent water leakage, and the like.

The invention will now be described in further detail by referring to Examples, wherein parts of quantity refer to parts by weight. It should be understood that the present invention is not restricted to the Examples.

EXAMPLE 1

An aqueously-swelling water-stopping composition consisting of the following ingredients was kneaded by a mixing mill.

| | |
|---|---|
| Polyisobutylene | 30 parts |
| (Vistanex L-100, made by Esso Co., U.S.A.) | |
| Hydrous silicic acid | 20 parts |
| (Nipsil VN-3, | |
| made by Nippon Silica Co., Ltd., Japan) | |
| Bentonite | 20 parts |
| (Kunigel, | |
| made by Kunimine Kogyo Co., Ltd., Japan) | |
| Polybutene | 30 parts |
| (HV-300, | |
| made by Nisseki Jushikagaku Co., Ltd., Japan) | |

The kneaded composition was extruded into a water stopper with a cross section of 200 mm by 4 mm, by using an extruder.

The degree of aqueous swelling of the water stopper thus extruded was measured after dipping it in water for 24 hours, and the rate of its volume expansion was 89.4% while the rate of its thickness expansion was 53.1%.

The water stopper was placed in a flange gap of a test flange assembly, which flange gap was adjusted at 5 mm. When water was poured in the test flange assembly, the water leaked in the beginning, because the 4 mm thick water stopper did not fill up the 5 mm flange gap. Despite the leakage, water was continuously poured into the test flange assembly, and in 2 hours, the amount of water leakage through the flange gap began to be reduced, and after 3 hours, the water leakage was stopped and the water stopper withstood a water pressure of 3 kg/cm$^2$.

EXAMPLE 2

An aqueously-swelling water-stopping composition consisting of the following ingredients was kneaded by a mixing mill.

| | |
|---|---|
| Polyisobutylene | 20 parts |
| (Vistanex L-140, made by Esso Co., U.S.A.) | |
| Butyl rubber | 10 parts |
| (Polyisoprene-isobutylene rubber No. 268, made by Nippon Butyl Co., Ltd., Japan) | |
| Hydrous silicic acid | 20 parts |
| (Nipsil VN-3, made by Nippon Silica Co., Ltd., Japan) | |
| Bentonite | 40 parts |
| (Kunigel, made by Kunimine Kogyo Co., Ltd., Japan) | |
| Naphthenic mineral oil | 10 parts |
| (Diana Process Oil KL-1, made by Idemitsu Kosan Co., Ltd., Japan) | |

The kneaded composition was rolled into a 4 mm thick sheet by the mixing mill. The degree of aqueous swelling of the sheet thus rolled was measured after dipping it in water for 24 hours, and the rate of its volume expansion was 80.9% while the rate of its thickness expansion was 46.5%.

EXAMPLE 3

An aqueously-swelling water-stopping composition having the following ingredients was kneaded by a mixing mill.

| | |
|---|---|
| Polyisobutylene | 20 parts |
| (Vistanex L-100, made by Esso Co., U.S.A.) | |
| Styrene-butadiene rubber | 10 parts |
| (SBR No. 1507, made by Nippon Goseigomu Co., Ltd., Japan) | |
| Hydrous silicic acid | 10 parts |
| (Nipsil VN-3, made by Nippon Silica Co., Ltd., Japan) | |
| Bentonite | 50 parts |
| (Kunigel, made by Kunimine Kogyo Co., Ltd., Japan) | |
| Polybutene | 5 parts |
| (HV-300, made by Nisseki Jushikogyo Co., Ltd., Japan) | |
| Naphthenic mineral oil | 5 parts |
| (Diana Process Oil, made by Idemitsu Kosan Co., Ltd., Japan) | |

The kneaded composition was rolled into a 4 mm thick sheet by the mixing mill. The degree of aqueous swelling of the sheet thus rolled was measured after dipping it in water for 24 hours, and the rate of its volume expansion was 119.9% while the rate of its thickness expansion was 78.3%.

EXAMPLE 4

An aqueously-swelling water-stopping composition consisting of the following ingredients was kneaded by a mixing mill.

| | |
|---|---|
| Polyisobutylene | 15 parts |
| (Vistanex L-140, made by Esso Co., U.S.A.) | |
| Natural rubber | 10 parts |
| (RSS No. 3, Smoked sheet) | |
| Hydrous silicic acid | 10 parts |
| (Nipsil VN-3, made by Nippon Silica Co., Ltd., Japan) | |
| Bentonite | 55 parts |
| (Kunigel, made by Kunimine Kogyo Co., Ltd., Japan) | |
| Polybutene | 5 parts |
| (HV-300, made by Nippon Jushikagaku Co., Ltd., Japan) | |
| Paraffinic mineral oil | 5 parts |
| (Diana Process Oil MM-45, made by Idemitsu Kosan Co., Ltd., Japan) | |

The kneaded composition was rolled into a 4 mm thick sheet by the mixing mill. The degree of aqueous swelling of the sheet thus rolled was measured after dipping it in water for 24 hours, and the rate of its volume expansion was 105.8% while the rate of its thickness expansion was 70.3%.

EXAMPLE 5

An aqueously-swelling water-stopping composition consisting of the following ingredients was kneaded by a mixing mill.

| | |
|---|---|
| Polyisobutylene | 10 parts |
| (Vistanex L-140, made by Esso Co., U.S.A.) | |
| Ethylene-propylene terpolymer | 10 parts |
| (EPT No. 1045, made by Mitsui Sekiyukagaku Co., Ltd., Japan) | |
| Hydrous silicic acid | 20 parts |
| (Nipsil VN-3, made by Nippon Silica Co., Ltd., Japan) | |
| Bentonite | 30 parts |
| (Kunigel, made by Kunimine Kogyo Co., Ltd., Japan) | |
| Polybutene | 25 parts |
| (HV-300, made by Nisseki Jushikagaku Co., Ltd., Japan) | |
| Stearic acid | 5 parts |

The kneaded composition was rolled a 4 mm thick sheet by the mixing mill. The degree of aqueous swelling of the sheet thus rolled was measured after dipping it in water for 24 hours, and the rate of its volume expansion was 86.6% while the rate of its thickness expansion was 58.5%.

EXAMPLE 6

An aqueously-swelling water-stopping composition consisting of the following ingredients was kneaded by a mixing mill.

| | |
|---|---|
| Polyisobutylene | 20 parts |
| (Vistanex L-140, made by Esso Co., U.S.A.) | |
| Butyl rubber | 10 parts |
| (Polyisoprene-isobutylene rubber No. 268, made by Nippon Butyl Co., Ltd., Japan) | |
| Silicic acid anhydride | 10 parts |
| (Aerozil No. 130, made by Nippon Aerozil Co., Ltd., Japan) | |
| Bentonite | 30 parts |
| (Kunigel, made by Kunimine Kogyo Co., Ltd., Japan) | |
| Naphthenic mineral oil | 10 parts |
| (Diana Process Oil KL-1, made by Idemitsu Kosan Co., Ltd., Japan) | |
| Aromatic mineral oil | 20 parts |
| (Diana Process Oil AH-10, made by Idemitsu Kosan Co., Ltd., Japan) | |

The kneaded composition was rolled into a 4 mm thick sheet by the mixing mill. The degree of aqueous swelling of the sheet thus rolled was measured after dipping it in water for 24 hours, and the rate of its volume expansion was 114.5% while the rate of its thickness expansion was 75.3%.

EXAMPLE 7

An aqueously-swelling water-stopping composition consisting of the following ingredients was kneaded in a mixing mill.

| | |
|---|---|
| Polyisobutylene (Vistanex L-100, made by Esso Co., U.S.A.) | 30 parts |
| Calcium silicate (Starlex L, made by Kamishima Kagaku Co., Ltd., Japan) | 20 parts |
| Bentonite (Kunigel, made by Kunimine Kogyo Co., Ltd., Japan) | 40 parts |
| Naphthenic mineral oil (Diana Process Oil KL-1, made by Idemitsu Kosan Co., Ltd., Japan) | 10 parts |

The kneaded composition was rolled into a 4 mm thick sheet by the mixing mill. The degree of aqueous swelling of the sheet thus rolled was measured after dipping it in water for 24 hours, and the rate of its volume expansion was 89.3% and the rate of its thickness expansion was 57.5%.

EXAMPLE 8

An aqueously-swelling water-stopping composition consisting of the following ingredients was kneaded by a mixing mill.

| | |
|---|---|
| Polyisobutylene (Vistanex L-80, made by Esso Co., U.S.A.) | 20 parts |
| Acrylonitrile-butadiene rubber (H230S, made by Nippon Goseigomu Co., Ltd., Japan) | 10 parts |
| Hydrous silicic acid (Nipsil VN-3, made by Nippon Silica Co., Ltd., Japan) | 20 parts |
| Bentonite (Kunigel, made by Kunimine Kogyo Co., Ltd., Japan) | 30 parts |
| Dioctyl phthalate (D.O.P., made by Kyowa Hakko Co., Ltd., Japan) | 10 parts |
| Naphthenic mineral oil (Diana Process Oil KL-1, made by Idemitsu Kosan Co., Ltd., Japan) | 10 parts |

The kneaded composition was rolled into a 4 mm thick sheet by the mixing mill. The degree of aqueous swelling of the sheet thus rolled was measured after dipping it in water for 24 hours, and the rate of its volume expansion was 82.7% while the rate of its thickness expansion was 53.9%.

EXAMPLE 9

An aqueously-swelling water-stopping composition consisting of the following ingredients was kneaded by a mixing mill.

| | |
|---|---|
| Polyisobutylene (Vistanex L-140, made by Esso Co., U.S.A.) | 20 parts |
| Styrene-butadiene rubber (SBR No. 1507, made by Nippon Goseigomu Co., Ltd., Japan) | 20 parts |
| Hydrous silicic acid (Nipsil VN-3, made by Nippon Silica Co., Ltd., Japan) | 20 parts |
| Bentonite (Kunigel, made by Kunimine Kogyo Co., Ltd., Japan) | 20 parts |
| Polybutene (HV,-300, made by Nisseki Jushikagaku Co., Ltd., Japan) | 20 parts |

The kneaded composition was rolled into a 4 mm thick sheet by the mixing mill. The degree of aqueous swelling of the sheet thus rolled was measured after dipping it in water for 24 hours, and the rate of its volume expansion was 92.3% while the rate of its thickness expansion was 60.3%.

EXAMPLE 10

An aqueously-swelling water-stopping composition consisting of the following ingredients was kneaded by a mixing mill.

| | |
|---|---|
| Polyisobutylene (Vistanex L-80, made by Esso Co., U.S.A.) | 20 parts |
| Hydrous silicic acid (Nipsil VN-3, made by Nippon Silica Co., Ltd., Japan) | 5 parts |
| Bentonite (Kunigel, made by Kunimine Kogyo Co., Ltd., Japan) | 60 parts |
| Naphthenic mineral oil (Diana Process Oil KL-1, made by Idemitsu Kosan Co., Ltd., Japan) | 15 parts |

The kneaded composition was rolled into a 4 mm thick sheet by the mixing mill. The degree of aqueous swelling of the sheet thus rolled was measured after dipping it in water for 24 hours, and the rate of its volume expansion was 132.1% while the rate of its thickness expansion was 85.8%.

REFERENCE 1

A composition consisting of the following ingredients was kneaded by a mixing mill.

| | |
|---|---|
| Polyisobutylene (Vistanex L-100, made by Esso Co., U.S.A.) | 10 parts |
| Butyl rubber (Polyisoprene-isobutylene rubber No. 268, made by Nippon Butyl Co., Ltd., Japan) | 30 parts |
| Hydrous silicic acid (Nipsil VN-3, made by Nippon Silica Co., Ltd., Japan) | 20 parts |
| Bentonite (Kunigel, made by Kunimine Kogyo Co., Ltd., Japan) | 20 parts |
| Polybutene (HV-300, made by Nisseki Jushikagaku Co., Ltd., Japan) | 20 parts |

The thus kneaded composition was extruded into a strap with a cross section of 20 mm by 4 mm, by using an extruder. The degree of aqueous swelling of the trap was measured after dipping it in water for 24 hours, and the rate of its volume expansion 40.6% while the rate of its thickness expansion was 26.4%.

The strap was placed in a flange gap of a test flange assembly so as to extend the entire length of the flange gap, which flange gap was adjusted at 5 mm. When water was poured into the test flange assembly, the water leaked because the 4 mm thick strap did not fill up the 5 mm thick flange gap. Despite the leakage, water was continuously poured into the test flange assembly, and in the case of the composition of this Reference 1, the water leakage was not stopped even after 20 hours of water pouring.

REFERENCE 2

A composition having the following ingredients was kneaded by a mixing mill.

| | |
|---|---|
| Polyisobutylene (Vistanex L-100, made by Esso Co., U.S.A.) | 30 parts |
| Hydrous silicic acid (Nipsil VN-3, made by Nippon Silica Co., Ltd., Japan) | 30 parts |
| Polybutene (HV-300, made by Nisseki Jushikagaku Co., Ltd., Japan) | 20 parts |
| Naphthenic mineral oil (Diana Process Oil KL-1, made by Idemistu Kosan Co., Ltd., Japan) | 20 parts |

The thus kneaded composition was extruded into a strap with a cross section of 20 mm by 4 mm, by using an extruder. The degree of aqueous swelling of the strap thus extruded was measured after dipping it in water for 24 hours, and the rate of its volume expansion was 49.2% while the rate of its thickness expansion was 28.8%.

The strap was placed in a flange gap of a test flange assembly so as to extend the entire length of the flange gap, which flange gap was adjusted at 5 mm. When water was poured in the test flange assembly, the water leaked because the 4 mm thick strap did not fill up the 5 mm thick flange gap. Despite the leakage, water was continuously poured into the test flange assembly, and in the case of the composition of this Reference 2, the leakage was not stopped even after 20 hours of the water pouring.

REFERENCE 3

A composition consisting of the following ingredients was kneaded by a mixing mill.

| | |
|---|---|
| Polyisobutylene (Vistanex L-100, made by Esso Co., U.S.A.) | 20 parts |
| Hydrous silicic acid (Nipsil VN-3, made by Nippon Silica Co., Ltd., Japan) | 5 parts |
| Bentonite Kunigel, made by Kunimine Kogyo Co., Ltd., Japan) | 70 parts |
| Naphthenic mineral oil (Diana Process Oil KL-1, made by Idemitsu Kosan Co., Ltd., Japan) | 5 parts |

The kneaded composition was rolled into a 4 mm thick sheet by the mixing mill. The degree of aqueous swelling of the sheet thus rolled was measured after dipping it in water for 24 hours, and the rate of its volume expansion was 181.3% while the rate of its thickness expansion was 106.0%. Although the composition of this Reference 3 had a high degree of aqueous swelling, the physical properties of the composition was so deteriorated after the aqueous swelling that the composition was found unsuitable for practical use.

The water stopper of the present invention will be now described in further detail by referring to the accompanying drawings.

FIG. 1 through FIG. 6 show water stoppers of the invention, each of which comprises an elongated solid core member with a high tensile strength and a layer of aqueously-swelling water-stopping composition enclosing the core member. In each of the figures, the water stopper comprises an elongated solid core member 1 having cross section suitable for actual use, such as circular, rectangular, square, planar, trapezoidal, or semi-circular shape. A layer 2 of the aqueously-swelling water-stopping composition encloses the entire outer surface of the elongated core member 1 in each of the embodiments of FIGS. 1 through 6, so as to complete the water stopper. The layer 2 must be made by using the aqueously-swelling water-stopping composition of the invention, which has been described in detail in the foregoing by referring to Examples 1 through 10.

The elongated core member 1, which is of string-like shape in the embodiments of FIGS. 1 through 6, has a high tensile strength and can be made of hard rubber, hard plastics, metal, or a combination thereof.

The core member 1 can be made hollow, regardless of its outside shape such as circular, rectangular, trapezoidal, and semi-circular shape.

It is noted that the present invention is not restricted to the use of only one layer of the water-stopping composition. Although the layer of the aqueously-swelling water-stopping composition is indispensable, two or more layers other materials can be provided in the water stopper.

Figure 7:
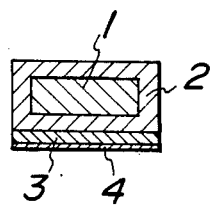
FIGS. 7 through 10 are schematic sectional and perspective views of water stoppers of the invention, each of which water stoppers has at least one adhesive layer secured to the layer of aqueously-swelling water-stopping composition enclosing a solid or hollow core member.
Figure 8:
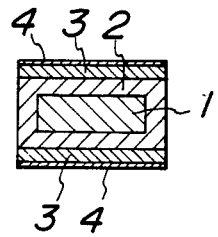
Figure 9:
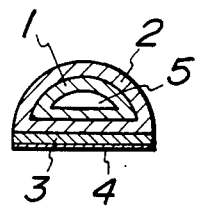

FIGS. 7 through 9 illustrate different embodiments of the water stopper according to the invention, in which at least one adhesive layer is secured to the aqueously-swelling water-stopping layer. In the embodiment of FIG. 7, an elongated core member 1 with a solid rectangular cross section is enclosed by a layer 2 of the aqueously-swelling water-stopping composition, and an adhesive layer 3 is secured to one outside surface of the aqueously-swelling water-stopping composition layer 2. A parting paper 4 is provided on the outer surface of the adhesive layer 3. The embodiment of FIG. 8 is similar to that of FIG. 7, except that a pair of adhesive layers 3 with parting papers 4 are secured to the opposite outside surfaces of the rectangular layer of the aqueously-swelling water-stopping composition. The purpose of the adhesive layer 2 is to facilitate the adhesion of the water stopper to the surface of a concrete or metallic structural member of architectural or civil engineering structures, especially when the aqueously-swelling water-stopping composition layer 2 does not have sufficient adhesiveness by itself.

FIG. 9 shows another embodiment of the invention. An elongated core member 1 of this embodiment has a semi-circular cross section with a central hollow portion 5, and an aqueously-swelling water-stopping composition layer 2 encloses the entire outer surface of the semi-circular core member 1. An adhesive layer 3 is secured to the flat outside surface of the semi-circular layer 2, and a parting paper 4 is provided on the outer surface of the adhesive layer 3.

Figure 10:
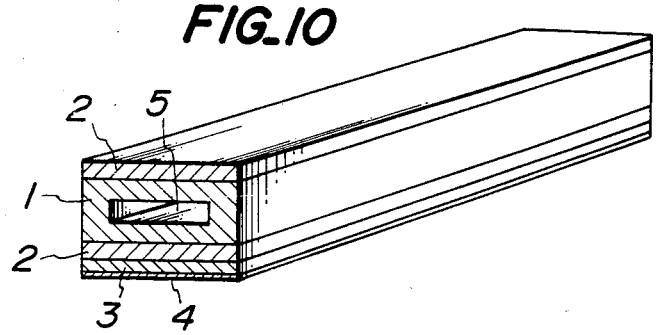

In another embodiment of the water stopper of FIG. 10, a rectangular core member 1 has a hollow portion 5 extending along the longitudinal central axis thereof, and a pair of planar layers 2, 2 of the aqueously-swelling water-stopping composition are secured to the opposite outer surfaces of the core member 1. An adhesive layer 3 is applied to the one out side surface of the water stopper, and a parting paper 4 is provided on the outer surface of the adhesive layer 3.

The parting paper 4 is to be removed from the adhesive layer 3 just before using the water stopper at site, so as to expose the adhesive layer 3 to facilitate the securing of the water stopper to the surface of concrete or metallic structural member of the building structure, or to a gap, a joint, or a juncture joint portion of concrete structures, whereby water is stopped at the water stopper.

Figure 11:
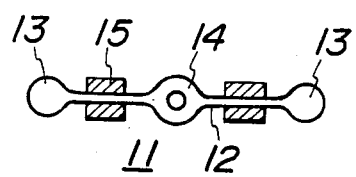
FIG. 11 is a schematic sectional view of a water stopper according to the present invention, which water stopper has a corrugated core member and paired layers of water-stopping composition secured thereon.
Figure 12:
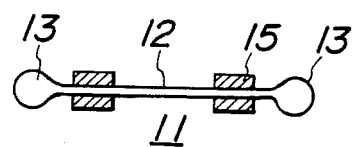
FIG. 12 is a schematic sectional view of a water stopper according to the present invention, which water stopper has a flat core member and paired layers of water-stopping composition secured thereon.

FIG. 11 and FIG. 12 illustrate modified forms of the water stopper of the invention, which are intended to further improve the water-stopping effect by using the aqueously-swelling water-stopping composition of the invention. FIG. 11 shows a corrugated water stopping plate, while FIG. 12 shows a flat water-stopping plate. In the figures, a water-stopping plate 11 has a planar member 12 with enlarged portions 13 formed at opposite edges thereof. The corrugated water-stopping plate 11 has a joint-fitting boss 14 extending along the longitudinal center thereof. In the embodiments of FIGS. 11 and 12, one pair of aqueously-swelling water-stopping composition members 15 are secured to one surface of the planar member 12 near the enlarge portions 13 and another pair of similar composition members 15 are secured to the opposite surface of the planar member 12. The aqueously-swelling water-stopping members 15 are to be buried in concrete structures to stop water as will be described in further detail by referring to FIGS. 19 and 20.

Figure 13:
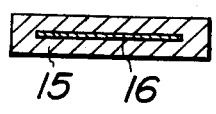
FIGS. 13 and 14 are schematic sectional views of water stoppers formed of aqueously-swelling water-stopping composition according to the present invention and having core members of strap and string shapes embedded therein.
Figure 14:
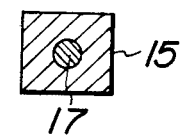

FIGS. 13 and 14 illustrate water stopper formed by disposing a reinforcing core member 16 or 17 in an elongated member 15 of the aqueously-swelling water-stopping composition of the present invention. In the embodiment of FIG. 13, the elongated member 15 of the aqueously-swelling water-stopping composition has a rectangular cross section, and the reinforcing member 16 of iron strap or wire lath is embedded in the member 15. In the case of FIG. 14, the elongated member 15 of the aqueously-swelling water-stopping composition is formed by extrusion so as to have a square cross section, while burying the round string-like core member 17 of plastics material in the composition of the member 15. Instead of the string-like core of plastics material, the core member 17 can be formed by using wire, strings, or straps of rubber, plastics or metal.

Figure 15:
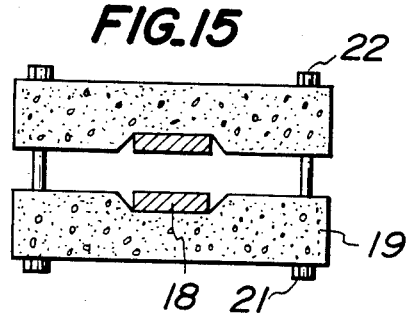
FIGS. 15 through 25 are diagrammatic illustrations of structural joints where the process of the stopping water according to the present invention is used.
Figure 16:
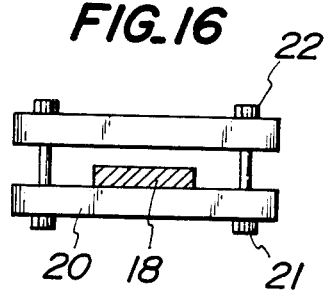

FIG. 15 and FIG. 16 show water stoppers made by extruding the aqueously-swelling water-stopping composition of the invention. In FIG. 15, an extruded member 18 of the aqueously-swelling water-stopping composition is attached to each of two opposing surfaces of concrete segments 19 to be joined. When the two concrete segments 19 are tightened together by bolts 21 and nuts 22, the two extruded members 18 come in contact with each other so as to stop water at the junction of the concrete segments 19. In FIG. 16, the extruded members 18 are used between two iron or other metallic members 20 in a manner similar to that of FIG. 15.

Figure 17:
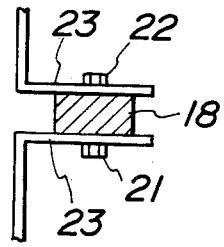

FIG. 17 shows the manner in which water is stopped at the junction of metallic or plastic flanges. An extruded member 18 of the aqueously-swelling water-stopping composition is disposed between flanges 23, 23 being joined, and the two flanges 23, 23 are tightened together by bolts 21 and nuts 22. The junction of the two flanges 23, 23 is watertightly closed by the extruded member 18 of the aqueously-swelling water-stopping composition of the invention upon tightening by the bolts 21 and nuts 22.

Figure 18:
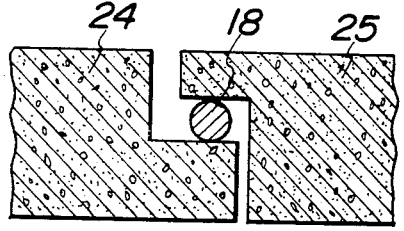

FIG. 18 shows the use of the extruded member 18 of the aqueously-swelling water-stopping composition to stop water at a junction between two concrete bodies 24, 25 in a similar manner to that of FIG. 17.

In using the extruded members 18 as shown in FIGS. 15 through 18, if adhesive layers 3 are provided on one or two surfaces of the extruded member 18 as shown in FIGS. 7 through 10, it becomes easier to attach the extruded member 18 of the aqueously-swelling water-stopping composition to the surfaces of bodies, pillars, beams, and flanges of concrete or metallic structures, so as to facilitate the work of stopping water at junctions of such structures. The adhesive layer 3, of course, improves the bondage between the water stopper such as the extruded member 18 of the aqueously-swelling water-stopping composition and the structural members whose junctions are to be watertightly closed.

Figure 19:
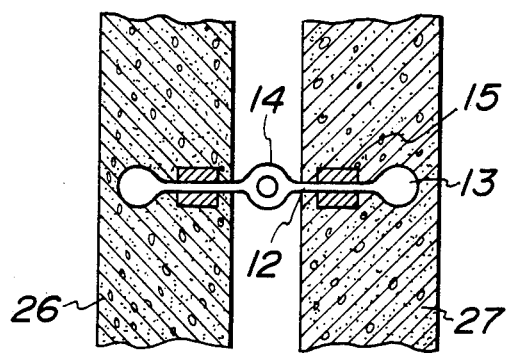
Figure 20:
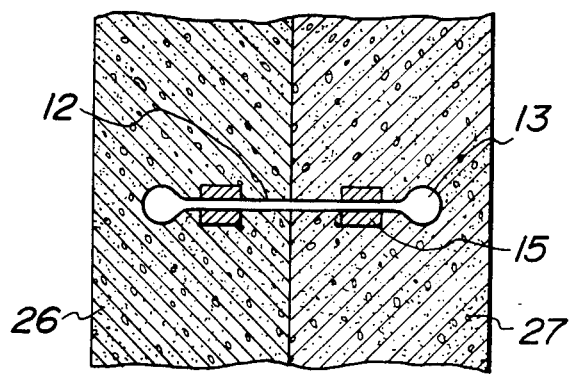

FIG. 19 and FIG. 20 show the way in which the water-stopping plates 11 of the invention as shown in FIGS. 11 and 12 are used at a juncture joint portion of concrete bodies during the process of placing the concrete. FIG. 19 illustrates the use of the corrugated plate type water-stopping plate 11 in the case that a joint gap is provided between adjacent concrete bodies 26, 27 being successively formed. FIG. 20 illustrates the flat type water-stopping plate 11 embedded in the concrete bodies 26, 27 being successively formed, so that the enlarged portions 13, 13 at the opposite edges of the water-stopping plate 11 are buried in the concrete bodies 26, 27 as anchors, whereby the concrete bodies 26 and 27 are successively formed without leaving any joint gap therebetween.

Figure 21:
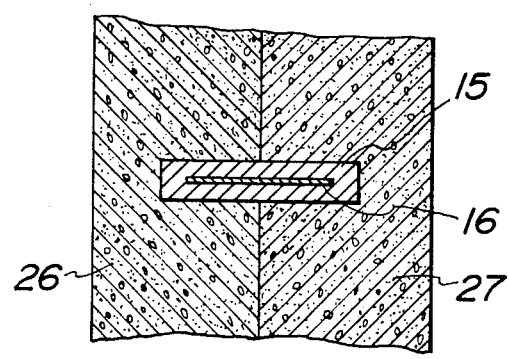

FIG. 21 shows the use of the aqueously-swelling water-stopping composition member 15 having a reinforcing member 16 buried therein of FIG. 13 at the juncture joint of concrete bodies 26, 27 being successively formed without any joint gap therebetween. In the case of FIG. 21, one half of the water-stopping composition member 15 is embedded in the concrete body 26, while the remaining half of the member 15 is embedded in the adjacent concrete body 27, so as to stop water at the junction of the concrete bodies 26 and 27.

FIGS. 22 through 25 show processes of stopping water at junctions of various structural bodies of building structures by using the water stoppers of the aqueously-swelling water-stopping composition of the present invention.

Figure 22:
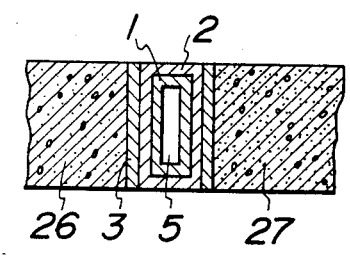

FIG. 22 shows flat or abutting joint of concrete boards, wherein the joint is made by abutting one edge of a concrete board 26 to the corresponding edge of another concrete board 27. In this case, if the adhesive layer 3 is provided on at least one surface of the water stopper as shown in FIG. 10, the field work is considerably simplified. More particularly, just before the work at site, the parting paper 4 is peeled off from the adhesive layer 3, and the exposed adhesive layer 3 is attached to the edge surface of the one concrete board 26 so as to integrally secure the water stopper to the concrete board 26, whereby the work of abutting the other concrete board 27 to the water stopper can be carried out easily and safely.

In this case, if the adhesive layers 3 are provided on opposite surfaces of the aqueously-swelling water-stopping composition layer 2 of the water stopper, the field work can be further simplified.

The water-stopping effect at the flat joint can be achieved solely by the aqueously-swelling water-stopping composition of the water stopper of FIG. 10, which water stopper is inserted at the flat joint of the adjacent concrete boards. Thus, although the adhesive layers 3 contribute to the improvement of the workability of the water stoppers, the adhesive layers 3 can be dispensed with in principle to achieve the water stopping effect. The provision of the adhesive layers 3 apparently improves the bondage of the water stoppers with the concrete body surfaces.

Figure 23:
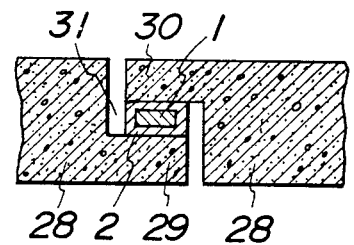

FIG. 23 shows a process of stopping water at joints of Hume pipes. A water stopper of the aqueously-swelling water-stopping composition of the present invention is inserted in a space between an inner annular edge portion 29 and outer annular edge portion 30 of adjacent Hume pipes 28, 28 being joined. The water stopper of this embodiment can be either one of the water stoppers of FIGS. 1 through 6 having the solid core members 1 enclosed by the aqueously-swelling water-stopping composition layers 2 and the water stoppers of FIGS. 7 through 10 having the solid or hollow core members 1 enclosed by the aqueously-swelling water-stopping composition layers 2.

If the water stopper having an adhesive layer 3 secured to one outside surface of the aqueously-swelling water-stopping composition layer 2 as shown in any of FIGS. 7, 9, and 10 is used, and if such water stopper is secured to the outer surface of the inner annular edge portion 29 of one Hume pipe 28 by using the adhesive layer 3, the joining work of the Hume pipes can be smoothly carried out, because the inner surface of the outer annular edge portion 30 of the other Hume pipe 28 slidably touches the water stopper at a portion where no adhesive layer is provided. Thus, the provision of the adhesive layer 3 at only one side of the water stopper is advantageous in the case of the pipe joint of FIG. 23 or the like.

Figure 24:
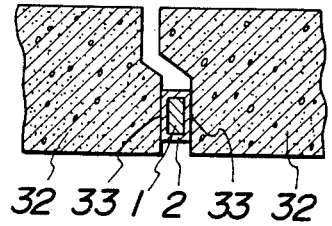

FIG. 24 shows the use of a water stopper at joint between edge surfaces 33, 33 of adjacent box culvert segments 32, 32. In this case, the water stopper is simply compressed by the two edge surfaces being joined, and the water stopper is freed from twisting or shearing of FIG. 23. Accordingly, it is preferable to have adhesive layers 3 at opposite outside surfaces of the water stopper as shown in FIG. 8. Although any one of the water stoppers shown in FIGS. 1 through 10 can be used in the case of the joint of box culvert segments, the water stopper of FIG. 8 having adhesive layers 3 provided at opposite surfaces thereof is preferable because such adhesive layers 3 improve the workability at the construction site.

Figure 25:
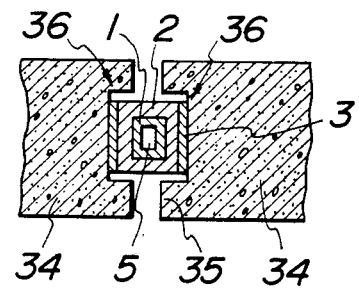

FIG. 25 shows the use of a water stopper at a joint between abutting edge surfaces 35, 35 of adjacent air-entrained concrete (ALC) boards 34, 34. In this case, grooves 36 are formed on the abutting edge surfaces 35 to receive the water stopper. Although any one of the water stoppers shown in FIGS. 1 through 10 can be used in the abutting joint between the air-entrained concrete boards 34, the water stopper with the hollow core member 1 of FIG. 10 is used in the case of FIG. 25, so as to facilitate absorption of pressure.

The adhesive layer 3 is preferable in this case either on one or two outside surfaces of the water stopper.

In the water stopper of FIG. 10, it is possible to make the hollow core member 1 by using foam rubber or the like foamed material. The hollow core member 1 made of foam rubber or the like can absorb most of dimensional differences at the joint portions and most of undulations on the concrete surfaces, by the compression and expansion of the core member 1. Minor gaps between the water stopper surfaces and the concrete surfaces can be filled by the swelling of the aqueously-swelling water-stopping composition of the water stopper of the invention when the water stopper absorbs water from the outside thereof. Thus, the water stopper of this case has dual water-stopping functions. Furthermore, when the adhesive layers 3 are provided on the water stopper, the water stopper can be secured tightly to the joint portion without applying any primer or separate adhesive thereto, whereby the time necessary to make the joint can be considerably shortened as compared with that of the prior art.

The continuous hollow core member 1 of foam rubber, which is disposed at the central portion of the water stopper, can be made by mixing a foaming agent and a vulcanizing agent in a regular rubber composition, extruding the mixture thus formed, and passing the extruded body through a suitable heating chamber. The material of the foamed hollow core member 1 can be a suitable synthesized resin, such as polyethylene.

The aqueously-swelling water-stopping layer 2 in the water stopper of the invention can be formed by using either of the following two compositions.

I. A composition consisting of
  10 to 40 weight % of rubber whose main ingredient is polyisobutylene.
  10 to 20 weight % of silicate,
  10 to 60 weight % of bentonite, and
  10 to 40 weight % of plasticizer.

II. A composition consisting of
  10 to 40 weight % of non-cross-linked or partly-cross-linked rubber whose main ingredient is polyisobutylene or a mixture thereof,
  10 to 20 weight % of silicate,
  10 to 60 weight % of bentonite, and
  10 to 40 weight % of plasticizer.

The degree of swelling of the aqueously-swelling water-stopping composition can be adjusted in a range of 50 to 100% by suitably selecting the ingredients thereof.

The composition layer can be intregrally overlaid on the aforesaid core member of foamed or non-foamed material by extruding the composition through a T-shaped head of an extruder while feeding the core member simultaneously. The adhesive layer can be formed by using any of natural rubber adhesive, synthetic rubber adhesive, and acrylic resin adhesive.

To use the water stopper, for instance that of FIG. 10, the parting paper is peeled off and the water stopper is attached to a surface to be joined, such as the groove 36 of FIG. 25, and another surface to be joined is held in contact with the opposite surface of the water stopper by a suitable holding means (not shown). When the hollow core member 1 is made of foam rubber or the like, the aqueously-swelling water-stopping composition of the layer 2 fills up most of the portions being joined, so that the aforesaid attaching of the water stopper alone can stop water at the joint.

When water is filled on one side of the water stopper, even if water leaks in the beginning due to some difficulty, the aqueously-swelling water-stopping composition swells as time elapses, and the water leakage is completely stopped in a few hours.

As described in the foregoing, the water stopper of the invention such as that of FIG. 10 can be easily applied to joint portions of concrete or metallic structural members, and the aqueously-swelling water-stopping composition fills up most of the gaps at the joint so as to stop water. If an adhesive layer 3 is provided on the water stopper, its application to the structural members being joined is made easier, and if the core member 1 of the water stopper is made of resilient material, such as foam rubber, the filling of gaps in the joint portion of the structural member with the aqueously-swelling water-stopping composition is enhanced. Furthermore, when water reaches the water stopper of the invention, the aqueously-swelling water-stopping composition layer 2 absorbs water and swells, so as to stop water more effectively and prevent water leakage. Thus, the invention contributes greatly to the formation of water-tight joint.

Although the invention has been described with a certain degree of particularity, it is understood that the present disclosure has been made only by way of example and that numerous changes in details of ingredients and construction and the combination and arrangement of parts may be resorted to without departing from the scope of the invention as hereinafter claimed.

What is claimed is:

1. An aqueously-swelling water-stopping composition consisting of: 10 to 40 weight % of rubber whose main ingredient is polyisobutylene having a molecular weight of from 70,000 to 130,000, 10 to 20 weight % of at least one silicate selected from the group consisting of silicic acid anhydride, hydrous silicic acid and calcium silicate, 10 to 60 weight % of bentonite, said silicate and bentonite acting as fillers, and 10 to 40 weight % of a plasticizer selected from the group consisting of paraffinic mineral oils, naphthenic mineral oils, aromatic mineral oils, stearic acid, palmitic acid, calcium stearate, castor oil, cotton seed oil, rapeseed oil, paraffin, paraffin chloride, dioctyl phthalate, dioctyl adipate, dibutyl sebacate, tricresyl phosphate, liquid chloroprene, liquid polyisobutylene, liquid polybutadiene, liquid polyisoprene and liquid polybutene.

2. An extruded water stopper made of an aqueously-swelling water-stopping composition consisting of: 10 to 40 weight % of rubber whose main ingredient is polyisobutylene having a molecular weight of from 70,000 to 130,000, 10 to 20 weight % of at least one silicate selected from the group consisting of silicic acid anhydride, hydrous silicic acid and calcium silicate, 10 to 60 weight % of bentonite, said silicate and bentonite acting as fillers, and 10 to 40 weight % of a plasticizer selected from the group consisting of paraffinic mineral oils, naphthenic mineral oils, aromatic mineral oils, stearic acid, palmitic acid, calcium stearate, castor oil, cotton seed oil, rapeseed oil, paraffin, paraffin chloride, dioctyl phthalate, dioctyl adipate, dibutyl sebacate, tricresyl phosphate, liquid chloroprene, liquid polyisobutylene, liquid polybutadiene, liquid polyisoprene and liquid polybutene.

3. A water stopper comprising an elongated core member with a high tensile strength, and at least one layer of an aqueously-swelling water-stopping composition secured to the outer surface of said core member, said aqueously-swelling water-stopping composition consisting of: 10 to 40 weight % of rubber whose main ingredient is polyisobutylene having a molecular weight of from 70,000 to 130,000, 10 to 20 weight % of at least one silicate selected from the group consisting of silicic acid anhydride, hydrous silicic acid and calcium silicate, 10 to 60 weight % of bentonite, and 10 to 40 weight % of a plasticizer selected from the group consisting of paraffinic mineral oils, naphthenic mineral oils, aromatic mineral oils, stearic acid, palmitic acid, calcium stearate, castor oil, cotton seed oil, rapeseed oil, paraffin, paraffin chloride, dioctyl phthalate, dioctyl adipate, dibutyl sebacate, tricresyl phosphate, liquid chloroprene, liquid polyisobutylene, liquid polybutadiene, liquid polyisoprene and liquid polybutene.

4. A water stopper as set forth in claim 3, wherein said core member is made of a material selected from the group consisting of hard rubber, hard plastics, metal, foam rubber, foamed plastics, and a combination thereof.

5. A water stopper as set forth in claim 4, wherein said core member is solid.

6. A water stopper as set forth in claim 4, wherein said core member is hollow.

7. A water stopper as set forth in claim 3, wherein said elongated core member is completely enclosed by said layer of aqueously-swelling water-stopping composition.

8. A water stopper as set forth in claim 3, wherein said elongated core member has a flat plate-like cross section with enlarged portions formed at opposite edges thereof, and at least a pair of said layers of aqueously-swelling water-stopping composition are secured to said core member near said enlarged portions.

9. A water stopper as set forth in claim 8, wherein said elongated core member has a boss formed at a central portion between said enlarged portions.

10. A water stopper as set forth in claim 3, wherein at least two covering layers enclose said elongated core member, an outer layer of said covering layers being made of said aqueously-swelling water-stopping composition, and at least a part of an outermost layer of said covering layers being made of water-passing resilient substance.

11. A water stopper as set forth in claim 3, wherein at least one adhesive layer is secured to outside surface of said layer of aqueously-swelling water-stopping composition.

12. A water stopper as set forth in claim 11, wherein a parting paper is provided on the outer surface of said adhesive layer.

13. A water stopper as set forth in claim 3, wherein said elongated core member has a hollow rectangular cross section and two layers of said aqueously-swelling water-stopping composition are secured to opposite outer surfaces of said elongated core member and at least one adhesive layer is provided on the outside surface of said composition layer.

14. A process of stopping water at a gap in a building structure, comprising the steps of forming a water stopper by enclosing an elongated core member having a high tensile strength with a layer of an aqueously-swelling water-stopping composition consisting of: 10 to 40 weight % of rubber whose main ingredient is polyisobutylene having a molecular weight of from 70,000 to 130,000, 10 to 20 weight % of at least one silicate selected from the group consisting of silicic acid anhydride, hydrous silicic acid and calcium silicate, 10 to 60 weight % of bentonite, and 10 to 40 weight % of a plasticizer selected from the group consisting of paraffinic mineral oils, naphthenic mineral oils, aromatic mineral oils, stearic acid, palmitic acid, calcium stearate, castor oil, cotton seed oil, rapeseed oil, paraffin, paraffin chloride, dioctyl phthalate, dioctyl adipate, dibutyl sebacate, tricresyl phosphate, liquid chloroprene, liquid polyisobutylene, liquid polybutadiene, liquid polyisoprene and liquid polybutene;

and placing the water stopper in the gap of the building structure, whereby the water stopper swells by absorbing water from the outside thereof so as to fill up that portion of the gap where said water stopper is placed.

15. A process as set forth in claim 14, wherein said water stopper is formed by enclosing an elongated core member having a high tensile strength with at least one layer of said aqueously-swelling water-stopping composition and an outermost layer having at least a part thereof made of water-passing resilient substance.

16. A process as set forth in claim 15, wherein said water stopper is made by enclosing said elongated core member with said layer of the aqueously-swelling water-stopping composition and providing at least one adhesive layer on outside surface of said layer of the aqueously-swelling water-stopping layer.

17. A process as set forth in claim 14, wherein said water stopper is made by providing an elongated core member having a flat cross section with at least a pair of layers of the aqueously-swelling water-stopping composition integrally secured to said flat core member, said pair of layers of aqueously-swelling water-stopping composition are buried in adjacent structures so as to prevent water leakage at the joint of said structures.

* * * * *